March 23, 1937.  D. SCHMIDT  2,074,992
PROCESS OF MAKING A BAG OR SIMILAR ARTICLE
Filed Aug. 8, 1935
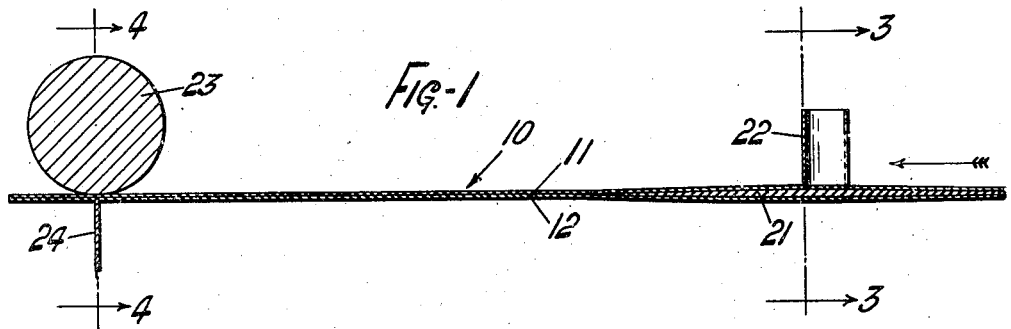
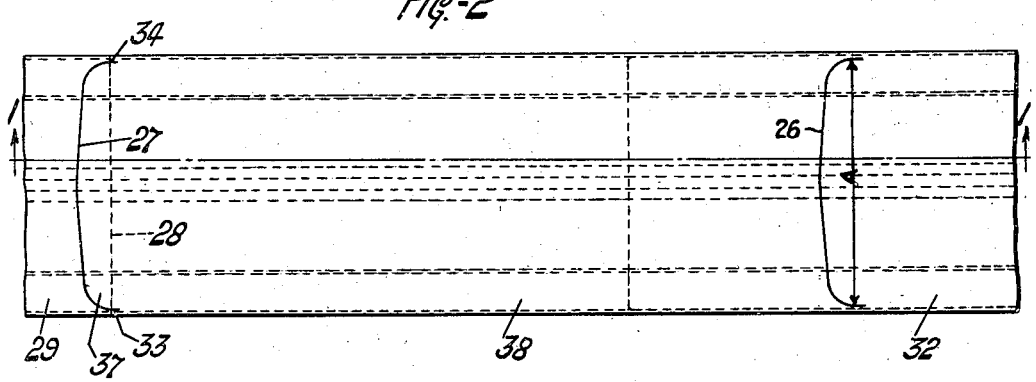
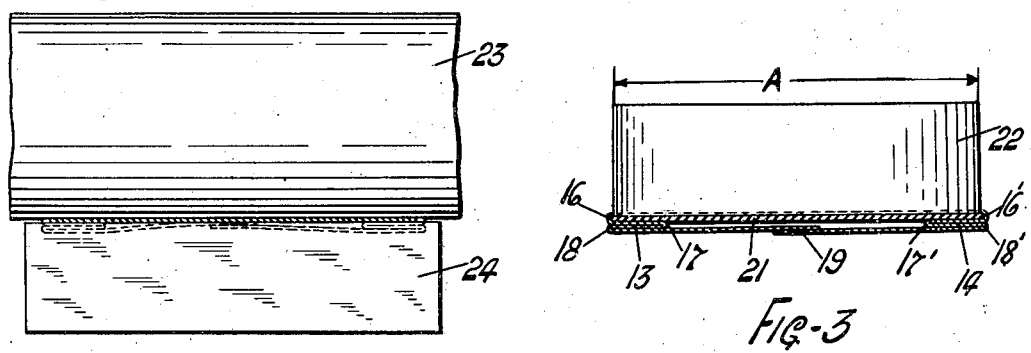
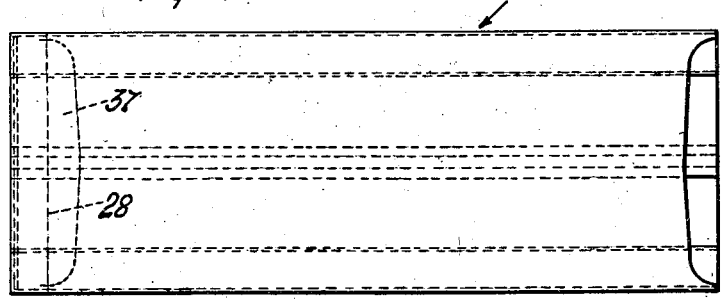
INVENTOR
DAVID SCHMIDT
BY G. P. Ely
ATTORNEY Patented Mar. 23, 1937

2,074,992

UNITED STATES PATENT OFFICE 2,074,992

PROCESS OF MAKING A BAG OR SIMILAR ARTICLE

David Schmidt, Cleveland, Ohio, assignor to The Dobeckmun Company, Cleveland, Ohio, a corporation of Ohio Application August 8, 1935, Serial No. 35,345

10 Claims. (Cl. 93—35)

This invention relates to the art of cutting regenerated cellulose sheeting and materials having similar characteristics and also the art of making bags and the like from such materials. Regenerated cellulose sheeting is more commonly known under the trade name of "Cellophane". As ordinarily used for bags, containers, wrappers and the like, this is a very thin material which is difficult to work with as it is usually less than one one-thousandth of an inch in thickness. Although the properties of this material have long been well known, it has never been possible to cut through one or any desired number of juxtaposed sheets or plies of this material directly toward plies which are not to be cut without separating the latter plies from those to be cut by a support such as a mandrel. This procedure has its disadvantages.

For instance, in the manufacture of bags as from regenerated cellulose sheeting, the sheet stock may be formed into a substantially flat tube having creased longitudinal edges and the tube may be separated into lengths or sections each of which may be made into a bag by having a bottom formed on one end thereof. In such a process whenever it is necessary to cut through only one wall or thickness of the tube, for example, the tube is passed over a mandrel against which the cut is made. As the mandrel has some thickness, the stock disposed about and along the longitudinal edges thereof is out of the plane in which the cut is made and therefore remains uncut. For this reason it has not been possible to make a cut, either curved or straight, across one wall of the tube from one of the longitudinal creased edges thereof to the other.

The purposes of this invention are to provide an improved method of cutting regenerated cellulose sheeting and like materials; and also to provide a method for making a bag or other article by cutting as desired across one wall of a tube of stock from one longitudinal edge thereof to the other.

In accordance with this invention, materials of the class referred to herein may be cut directly against each other, that is by passing a cutting edge through one or any desired number of plies or sheets of material toward but not into a ply or sheet disposed directly against a ply being cut. It has been found that if superposed sheets of these materials are adequately supported in the line of applied pressure, as on a cylinder or roller having substantially a line contact or on a plane surface, the cutting edge may be passed through only one or the desired number of sheets without cutting through an adjacent sheet, and the uncut sheet is capable of withstanding the pressure transmitted from the cutting edge while the cut is being made, without being marked or damaged in any way. In this way one side of a tube of stock may be cut directly against the other to form the end edge of one side of a bag.

The features of the invention are illustrated in the accompanying drawing, wherein:

Fig. 1 is a section along the line 1—1 of the tube of stock shown in Fig. 2, showing this tube passing over a mandrel and beneath a curved cutter and between a roller and a straight cutter;

Fig. 2 is a top plan view of the tube of stock shown in Fig. 1, the roller and the cutters being removed for purposes of illustration;

Fig. 3 is a section on the line 3—3 of Fig. 1;

Fig. 4 is a section along the line 4—4 of Fig. 1; and

Fig. 5 is a plan view of a finished bag.

The method of this invention may be practised as shown in the drawing by providing a web of stock in the form of a substantially flat tube indicated generally at 10 and comprising upper and lower plies or walls 11 and 12 respectively. It will be understood that tubes of stock may be provided in various forms depending on the type of bag or other article to be produced. The illustrated tube has the flat upper and lower walls thereof joined by side walls 13 and 14 formed by folding the marginal portions of the tube inwardly between the upper and lower walls, providing the longitudinal creased edges 16, 17, 18 and 16', 17' and 18' (Figs. 3 and 4). The lower wall 12 has a longitudinal seam 19.

This tube is advanced in the direction of the arrow or from right to left as viewed in Fig. 1, so that the tube passes over a mandrel 21 and beneath a curved cutter 22, and as the tube continues to advance it passes beneath a roller 23 and above a straight cutter 24. It will be understood of course that while the tube is advancing the cutters 22 and 24 are withdrawn from the path of the tube, and at the proper time each cutter is moved toward the tube to the positions shown. The cutting edge of the curved cutter 22 extends transversely across the upper wall of the tube to points adjacent but spaced inwardly from the longitudinal edges 16 and 16' so that this cutter is effective only for cutting transversely of the tube for a distance represented by the dimension A (Figs. 2 and 3). The stock forming the longitudinal edges 16 and 16' is disposed about the longitudinal edges of the mandrel and is not cut by this cutter. It will also be observed that this cutter cuts against the mandrel (Fig. 3) which protects the sides 13 and 14 and the lower wall 12 from the cutting edge. The cutter 22 forms the curved cuts 26 and 27 (Fig. 2) which extend only through the upper wall of the tube.

The straight cutter 24 extends entirely across the lower wall of the tube and preferably beyond the longitudinal edges 16 and 16' as shown in Fig. 4. The roller 23 extends across the upper wall of the tube and has substantially a line contact therewith directly opposite the cutting edge of cutter 24.

In order to make a series of bags from the tube 10 as shown in the drawing, the tube is passed over the mandrel and when the proper point in the tube is beneath the cutter 22 the latter is caused to descend from a raised position (not shown) to the position shown in Figs. 1 and 3. The cutting edge of this cutter passes entirely through the upper wall 11 and forms the curved cut 27 for example, after which the cutter 22 is withdrawn and the tube continues to advance. Preferably this cutting operation is performed without stopping the stock by causing the cutter 22 and the mandrel to move together with the stock until the cutter has been withdrawn. The curved cut 26 and other similar cuts (not shown) are formed in the same way as the stock advances.

As the stock leaves the mandrel the upper and lower walls of the tube may come substantially together as shown in Fig. 1. As the desired portion of the tube passes between the roller and the cutter 24 the latter is caused to ascend so as to form a straight cut or slit 28 (Fig. 2) extending entirely through the lower wall 12 and the double thicknesses of stock constituting the side walls 13 and 14, but the upward movement of this cutter is arrested after its cutting edge has passed through the lower wall and the double thicknesses of the side walls 13 and 14 and before this cutting edge enters or marks the opposed inner surface of the upper wall 11. During this cutting operation the upper wall 11 is supported firmly along the line of the cut by the line contact provided by the roller 23. This forms the straight cut 28 (Fig. 2) and it will be understood that other straight cuts are formed in the same manner. Preferably the roller 23 and the straight cutter 24 move in unison at the speed of the stock during this cutting operation so that it is unnecessary to stop the tube to make the straight cuts.

In making these straight cuts it will be observed that the lower wall 12 and the two thicknesses of stock forming the side walls 13 and 14 are cut directly against the upper wall 11 without using a mandrel or any other interposed backing or support member to receive the thrust of the cut or to protect the inner surface of the upper wall from the cutting edge. The thrust or pressure of this cut therefore is transmitted through the upper wall 11 to the roller 23 and yet this upper wall remains uncut and its inner surface is not marked or damaged in any way.

From Fig. 2 it will be seen that the curved cut 27 forms a recess on the length or section 29 and this same cut forms a flap on the length or section 31 of the tube. Similarly, the curved cut 26 forms a recess in the upper wall of section 31 and a flap on the upper wall of section 32 of the tube. The cuts 26 and 27 leave the sections 29 and 31 joined only by the material of the upper wall indicated at 33 and 34, which was not cut by the curved cutter 22. After the stock leaves the roller 23 and cutter 24, the sections 29 and 31 are separated by speeding up the feed rollers so as to break away the uncut material 33 and 34 as is well understood in this art.

The bag 36 (Fig. 5) may be formed from the section 31 for example, after making another straight cut in the lower plies adjacent to the cut 26 in the upper wall and separating the sections 31 and 32, by folding over the flap 37 formed on the upper wall by the cut 27, and securing this flap to the lower plies in any approved manner as indicated in Fig. 5. This forms the bottom of the bag. The curved cut 26 then provides a recessed portion in the wall 11 at the open end of the bag. At the open end of the bag the straight end edges of the sides 13 and 14 and the lower wall 12 are formed by a straight cut similar to the cut 28. It will be understood that other bags are formed from other sections of the tube in identically the same manner.

From the foregoing it will be seen that the straight cuts made by the cutter 24 extend entirely across the tube from and between the creased edges 18 and 18', through the lower ply or wall 12 and through both plies or thicknesses of the folded side walls 13 and 14 to the creased edges 16 and 16'. While the method of cutting one or more thicknesses of stock against another layer or thickness has been illustrated only in forming the straight cuts with cutter 24, it will be evident that curved cuts, such as the cuts 26 and 27 for example, may be made by this method if this is desired for any reason. If the curved cuts are made by this method of cutting one ply of material against another these curved cuts could be made to extend to the longitudinal creased edges instead of terminating at points spaced therefrom as shown in the drawing. The improved method therefore makes it possible to make straight, irregular or curved cuts through any desired number of plies against another ply without cutting or damaging the latter, and any or all of the cuts so made may extend only part way or entirely across the tube from and between the longitudinal creased edges thereof.

What is claimed is:

1. The method of making an article from sheet material of the class described which comprises cutting one or more of a plurality of superposed plies against an adjacent ply by passing a cutting edge through said one or more plies directly toward but not into said adjacent ply, while supporting the latter ply along the line of the cut being made.

2. The method of making an article from superposed plies of sheet material of the class described which comprises supporting one ply along the line of a cut to be made, concomitantly cutting against said one ply a plurality of adjacent plies along one portion of said line and an adjacent single ply along another portion of said line by passing a cutting edge through said plurality of plies and through said single ply directly toward but not into said one ply.

3. The method of making a bag or similar article which comprises supplying stock in the form of a substantially flat tube, forming in one side of said tube transverse slits spaced to define the free end edges of one side of a bag, by cutting through said one side directly toward and against but not into the other side while supporting the latter side along the lines of the cuts being made.

4. The method of making a bag or similar article which comprises supplying stock in the form of a substantially flat tube, forming in one side of said tube a single, continuous transverse slit extending from and between the longitudinal edges of the tube, by cutting through said one side directly toward but not into the other side while supporting the latter side directly along the line of the cut being made.

5. The method which comprises providing superposed plies of sheeting of the class described disposed substantially against each other and joined by a fold edge, and cutting through at least one of said plies against but not into the other to form a slit extending from said fold edge, while supporting the uncut ply along the line of said slit.

6. The improvement in the art of making bags from a substantially flat tube of stock and comprising superposed plies of material of the class referred to, which comprises forming in one wall of said tube curved cuts spaced longitudinally thereof to form a flap and a recess respectively in adjacent ends of adjacent bags and cutting through the opposite wall of said tube directly against but not into said flaps to form slits defining the end edges of adjacent ends of said bags.

7. The improvement in the art of making bags from a substantially flat tube of stock having creased longitudinal edges and comprising superposed plies of material of the class referred to, which comprises forming in one wall of said tube curved cuts spaced longitudinally thereof to form a flap and a recess respectively in adjacent bags, and cutting through the opposite wall of said tube directly against but not into said flaps to form slits extending from and between said creased longitudinal edges and defining the end edges of adjacent ends of said bags.

8. The improvement in the art of making a bag, comprising forming a tube of bag material, passing the tube over a mandrel, cutting one wall of the tube upon the mandrel, passing the tube off the mandrel, supporting the tube against a surface and cutting the opposite wall of the tube against the first wall by passing a knife through the opposite wall but not into the first wall.

9. The improvement in the art of making a bag, comprising forming a tube of regenerated cellulose sheeting, passing the tube over a mandrel, cutting one wall of the tube against the mandrel, passing the tube off the mandrel, supporting the tube against a surface and cutting the opposite wall of the tube while supported directly by the first wall by passing a knife into the second wall, the space between the supporting surface and the knife during the cutting operation being fixed at the thickness of the first wall.

10. The improvement in the art of making a bag, comprising forming a tube of bag stock and severing the tube into bag lengths by cutting the tube walls from opposite sides, one of said cuts being made against a mandrel located within the tube and the other by cutting against the opposite wall of the tube while the tube is exteriorly supported, the cutting instrumentality then penetrating one wall of the tube only.

DAVID SCHMIDT.